Figure 1:
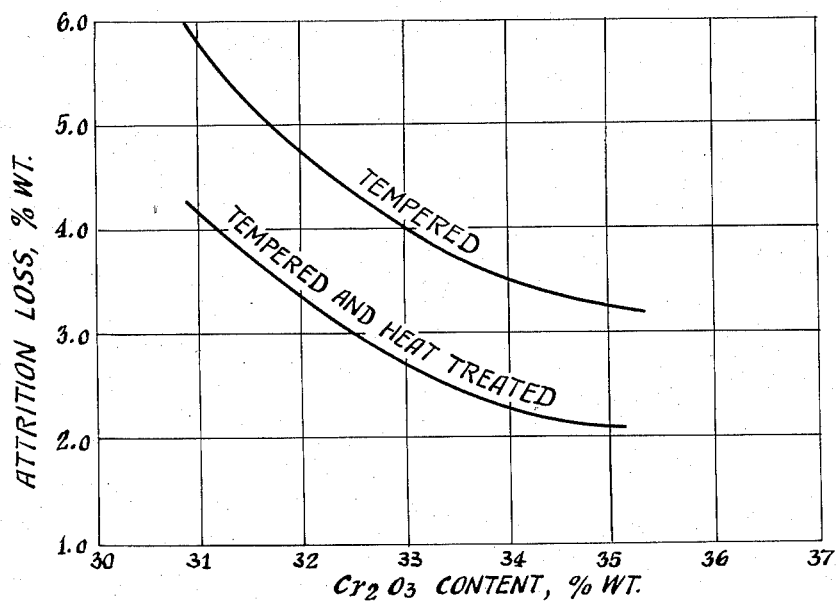

INVENTORS
Charles H. Lechthaler
William A. Stover
BY
Raymond W. Barclay
ATTORNEY

United States Patent Office 2,843,552
Patented July 15, 1958

2,843,552

PREPARATION OF ATTRITION-RESISTANT CHROMIA-CONTAINING CATALYST

Charles H. Lechthaler, Woodbury, and William A. Stover, Pitman, N. J., assignors to Socony Mobil Oil Company, Inc., a corporation of New York Application April 1, 1953, Serial No. 346,062

13 Claims. (Cl. 252—455)

This invention relates to an improvement in the preparation of chromia-containing gels. More particularly, the present invention is concerned with a process for rendering chromia-containing gels more resistant to attrition. The process of the invention is especially directed to a method for improving the handling strength of gel composites containing an appreciable amount of chromia, such composites finding use as catalysts, adsorbents, catalyst supports, carriers, and various other applications where rigidity and ability to withstand abrasion upon handling are considered desirable attributes.

Modern catalytic processes require catalysts which are not only specifically active in the chemical reactions which are to be catalyzed but also possess physical characteristics required for successful commercial operation. One of the outstanding physical attributes of a commercial catalyst is hardness, that is, resistance to attrition. The ability of a particle to hold its shape in withstanding the mechanical handling to which it is subjected in storage, shipment, and use is a primary requirement for a successful catalyst in modern catalytic processes.

Thus, many operations for the conversion of hydrocarbon materials are carried out in the presence of a porous contact mass composite of particles which themselves have a catalytic effect or which are impregnated with or act as a support for other catalytic material of a nature appropriate to the result desired. These catalytic processes are advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, using up the catalyst and giving rise to an excessive amount of fines, which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst at take up foreign material detrimental to its catalytic properties. A hard, porous, catalytic material having the ability to resist abrasion during the necessary handling involved during continual conversion and regeneration is definitely a desirable attribute in overcoming the aforementioned disadvantages.

Also, in hydrocarbon conversions carried out at elevated temperatures in the presence of solid, porous catalysts, the deposition of carbon on the surface of the catalyst takes place. This carbonaceous coating soon covers the surface of the catalyst, necessitating removal of the coating before the catalyst can continue to promote the reaction. In some catalytic operations, the active life of the catalyst is only a few minutes on stream, after which the carbon is removed by burning to reactivate the mass and permit the efficient operation of the process. The provision of a catalyst which retains its porosity but has a high degree of hardness, rendering the same resistant to the thermal shock encountered upon being used in high temperature conversions and during repeated regeneration is a distinct advantage in any catalytic process.

A particularly useful catalyst in certain hydrocarbon conversion processes, such as reforming, isomerization, desulfurization, etc., is one containing chromia in appreciable amount, say quantities of 1 percent by weight or more. The chromia is usually employed in combination with one or more other inorganic oxides and generally with alumina in the form of a cogel but may be combined with various other metal oxides consistent with the desired catalytic performance. Chromia-containing gel composites employed as catalysts in hydrocarbon conversion reactions have been found to exhibit excellent catalytic properties and to offer a reasonable resistance to attrition. Since a further improvement in the latter characteristic is a distinct advantage in commercial operation, serving to reduce overall operating costs of a process utilizing such catalyst, a method for increasing attrition resistance of chromia-containing gel catalyst is highly desirable.

One object of this invention, therefore, is to provide a chromia-containing gel of improved hardness characteristics. Another object is the provision of a process for improving the resistance to attrition of a gel composite containing chromia. A still further object is the provision of a hard, porous particle-form catalytic mass containing an appreciable amount of chromia and capable of withstanding severe thermal treatment without adverse effect. Other objects and advantages of this invention will be apparent to those skilled in the art from the following description.

In accordance with the process of this invention, it has been discovered that increased resistance to attrition may be imparted to a chromia-containing gel by thermal treatment of the same in an oxidizing atmosphere under particularly defined conditions of time and temperature. It has been found that a chromia-containing gel subjected to treatment at a temperature in excess of about 1200° F. in an oxidizing atmosphere has a substantially greater resistance to attrition than gel which has not undergone such thermal treatment.

The process described herein thus contemplates the preparation of a chromia-containing gel involving the steps of (1) formation of a chromia-containing hydrosol, (2) gelation of said hydrosol to a hydrogel, (3) drying of the resulting hydrogel, (4) tempering of the dried hydrogel in a non-oxidizing atmosphere, and (5) heat treatment of the tempered gel in an oxidizing atmosphere at an elevated temperature greater than about 1200° F. The invention, as will be understood, resides particularly in step 5 of the aforementioned process. Tempering of a chromia-containing gel, after drying, is necessarily carried out in the absence of oxygen to prevent undue oxidation of the chromium at the elevated tempering temperature. Thus, it has heretofore been suggested that chromia-containing composites be calcined or tempered under vacuum. In accordance with the process of the present invention, it has been found that a chromia-containing gel ordinarily tempered in a non-oxidizing atmosphere is unexpectedly rendered more resistant to attrition by subsequently subjecting such tempered chromia-containing gel to an oxidizing atmosphere at a temperature above 1200° F. and particularly in the range of 1200° F. to 1500° F.

Chromia gels or gels containing an appreciable amount of chromia, i. e., greater than about 1 percent by weight, are suitably treated by the process of this invention. Thus, gels undergoing the present treatment may comprise composites of chromia with one or more other oxides such as alumina, zirconia, magnesia, silica, titania, molybdena, and manganese oxide.

Typical of the chromia-containing gel composites improved by present thermal treatment are those of alumina and chromia. These gels may be prepared by the procedure described in copending application of William A. Stover and Robert C. Wilson, Jr., Serial No. 201,537, filed December 14, 1950, now Patent No. 2,773,839. In accordance with such procedure, a chromia-alumina hydrosol is prepared by the reaction of chromic acetate and sodium aluminate. Hydrosols capable of quickly setting to hydrogels are particularly desirable for the production of bead-like spheroidal particles. The resulting hydrosol is permitted to set to a hydrogel and such hydrogel is thereafter aged and washed with water. The washed chromia-alumina hydrogel is satisfactorily dried in either superheated steam or hot air but the use of steam is preferred from the standpoint of minimum drying time. The optimum drying conditions with superheated steam comprise initial drying of the chromia-alumina hydrogel at a temperature of 230–235° F. until shrinkage of the hydrogel is substantially complete. The temperature is thereafter slowly raised to 350° F. over a period of about 2 hours. The resulting hydrogel, dried as described above, contains about 40 to 45 percent by weight of water. The dried hydrogel is then tempered in a non-oxidizing atmosphere preferably by indirect heating in an air-free steam atmosphere at a temperature in the range of 600° F. to 1200° F. and preferably in the range of 900° F. to 1100° F. Indirect heating during the tempering operation insures a low heating rate, not in excess of about 4° F. per minute, necessary for obtaining unbroken gel particles. In this operation, a steam atmosphere is conveniently provided by evaporation of the water remaining in the catalyst after the drying operation.

Chromia-alumina gel particles dried as described above weaken and shatter when heated at rates as low as 3° F. per minute to 1000° F. in either an atmosphere of carbon dioxide or nitrogen because of too rapid loss of water. However, if the moisture content of the catalyst is reduced to about 10 percent by weight by preheating to 600° F. in a steam atmosphere, the gel particles are not damaged by further tempering to 1000–1100° F. in an atmosphere of either nitrogen or carbon dioxide.

The use, during tempering, of mixtures containing an appreciable amount of oxygen, i. e., more than about 5 percent volume, results in the production of a gel having low mechanical strength. Of the media tested, a mixture containing oxygen was the only agent found which reduced catalytic activity of the gel particles as measured by their capacity for dehydrogenation of naphthenes. The particles of chromia-alumina gel should accordingly be tempered in a non-oxidizing atmosphere such as an inert or reducing atmosphere. The effect of tempering gel beads containing approximately 32 percent by weight chromia and 68 percent by weight alumina, previously dried with superheated steam to a maximum temperature of 325–340° F., in an atmosphere of air, as compared with an atmosphere of steam, is shown in the following table:

TABLE I

| Tempering Atmosphere | Air | Steam |
| --- | --- | --- |
| Heating Rate, °F. per Minute | 3 | 3 |
| Maximum Temperature, °F | 1,000 | 1,000 |
| Properties of Tempered Catalyst: | | |
| Whole Beads, Percent Weight | 27 | 94 |
| Hardness Index | 73 | 98 |

As will be evident, tempering in air resulted in extensive breakage of the gel beads and gave a product of reduced hardness index. The latter is determined by a standard test involving the subjecting of an 80 cc. sample of particle size from 4000 to 6350 microns (#3 to #5 mesh), which had been previously tempered for 3 hours at 1050° F. in a dry air atmosphere, to a one-hour tumbling with eight steel balls of $15/16$ of an inch in diameter, in a container rotating at 80 R. P. M. Under these conditions, the hardness index represented the proportion (in percent weight) of residual catalyst of particle size greater than 3360 microns (#6 mesh).

In accordance with the present invention, it has been discovered that chromia-containing gels tempered as described above can be made considerably more resistant to attrition by heating the same at a temperature in the approximate range of 1200° F. to 1500° F. for at least about ½ hour. Thus, freshly prepared chromia-containing gel which has been so heat treated has an attrition loss, as determined by the Lauson shaker test hereinafter described, of about half of that obtained with the identical gel which has only been tempered in a non-oxidizing atmosphere at a temperature not exceeding about 1200° F.

Heat treatment of chromia-containing gels in accordance with the instant process is effected in an oxidizing atmosphere such as air, oxygen, ozone, nitrogen oxides, etc. Preferably, air is employed as the oxidizing atmosphere. It is preferred that such atmosphere be passed continuously through and around the gel undergoing treatment so that a fresh supply of oxidizing agent is thereby provided. Atmospheres in which there is no active oxidizing agent will not afford the improvement in attrition resistance achieved by the process of the invention. Thus, treatment of a chromia-alumina gel composite at temperatures from 1000 to 1600° F. for periods as long as 48 hours in a carbon dioxide atmosphere resulted in no appreciable improvement in attrition resistance.

In addition to being an oxidizing atmosphere, the medium in which heat treatment is effected in accordance with the instant process should be substantially free of moisture. Small amounts, less than about 10 percent by volume of steam, may be tolerated in the heat treating atmosphere, but substantially greater quantities of steam result in a mechanically weak gel structure, so that the resulting product has an attrition equal to or greater than that obtained with gel which has merely been tempered without having been subjected to the subsequent heat treatment. It is accordingly necessary that the chromia-containing gel undergoing treatment in accordance with the present invention be substantially free of water. As noted above, removal of water from the freshly formed hydrogel is ordinarily achieved by drying and tempering. However, the heat treatment described herein may likewise be applied to chromia-containing gels having water removed therefrom by other means, such as solvent extraction or displacement methods or merely by permitting the freshly formed hydrogel to stand over an extended period of time in dry atmosphere.

The temperature of heat treatment is carried out between about 1200° F. and about 1500° F. and preferably between about 1300° F. and about 1400° F. Temperatures lower than about 1200° F. fail to impart improved attrition resistance to the treated gel, while the use of temperatures in excess of about 1500° F. results in product of reduced physical strength as well as a loss of catalytic activity.

The duration of the above heat treatment should be at least ½ hour. Preferably, the time of heat treatment is between ½ and 2 hours. While the improved results with regard to attrition resistance appear to be substantially complete within a maximum of about 4 hours, the heat treatment may be continued up to 96 hours without detriment to the resulting product. Excessively long periods of heat treatment greater than about 96 hours, particularly at the higher temperatures, have a deleterious effect on the catalytic activity and selectivity of the gel product being treated and consequently are to be avoided. Thus, a catalytic composite containing approximately 32 percent $Cr_2O_3$ and 68 percent $Al_2O_3$, treated for 96 hours at 1400° F. required a temperature 26° F. higher than that for the untreated catalyst at 98 CFRR+3 cc. TEL octane level and the gasoline yield at that level was reduced 2 volume percent.

The treating process described herein is generally applicable in improving attrition resistance of substantially dry gels containing an appreciable amount of chromia, i. e., greater than about 1 percent by weight. Composites of chromia with other oxides may be effectively treated by the present process. Composites of chromia with substantial amounts of iron, molybdenum, nickel, or oxides of these metals, while undergoing improvement with regard to attrition resistance, are improved to a lesser degree than chromia-containing gels wherein these substances are absent. Gel composites of chromia with titania, zirconia, silica, magnesia and manganese oxide may be advantageously treated in accordance with the instant process. Cogels of chromia and alumina are particularly susceptible to improvement by the heat treatment method described herein. Thus, cogels containing approximately 20 to 50 weight percent chromic oxide and approximately 50 to 80 weight percent aluminum oxide may be treated with a resultant marked improvement in attrition resistance. In particular, cogels having a chromia content in the range of 30 to 40 weight percent and an alumina content in the range of 60 to 70 weight percent are rendered attrition resistant in accordance with the present heat treating process.

The attrition characteristics of the chromia-containing gels treated in accordance with the method described herein were determined by an attrition test known as the Lauson shaker test. The procedure used in the test consists of shaking a 50 cc. sample of the product to be tested in a closed steel cup which is bolted to the piston of a motor-driven Lauson engine at 1350 R. P. M. After shaking for 10 seconds, the catalyst fines produced passing through a 10-mesh (Tyler) screen are replaced with an equal weight of fresh catalyst make-up. These operations are repeated for 20 cycles, or until the amount of fines produced during successive cycles remains essentially constant. The attrition (fines loss per cycle), expressed as percent of original sample, is plotted against the cumulative weight percent replacement. The equilibrium weight percent fines, as read from this plot, is reported as the Lauson shaker test attrition.

Figure 1 of the attached drawing shows the effect of chromia content on the thermal hardening of chromia-alumina cogel which had been tempered and then heat treated in air at 1400° F. for 2 hours. This figure also shows the effect of chromia content on the Lauson shaker hardness of chromia-alumina gel composites which had been tempered at 1100° F. in their own steam atmosphere. As will be noted, the optimum resistance to attrition for both tempered and heat treated chromia-alumina gel was obtained with a chromia content in the approximate range of 32 to 36 weight percent. It is also to be noted that the heat treated gel in every instance exhibited a Lauson shaker hardness of 1.2–1.6 weight percent equilibrium fines in excess of that obtained with the gel which had been merely tempered.

Figure 2:
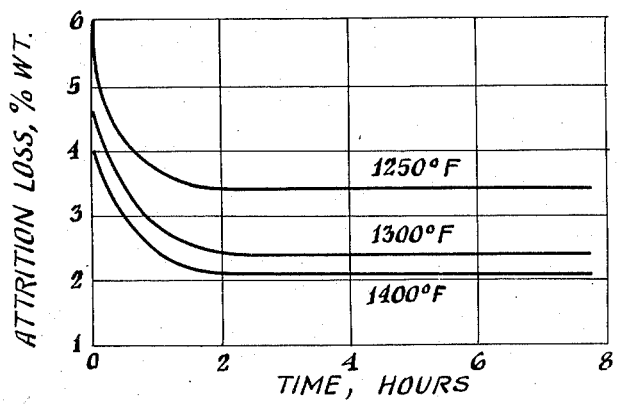

Figure 2 of the attached drawing shows the effect of heat treatment in air at different temperatures upon hardness of a chromia-alumina gel containing about 32 weight percent chromia and about 68 weight percent alumina.

Figure 3:
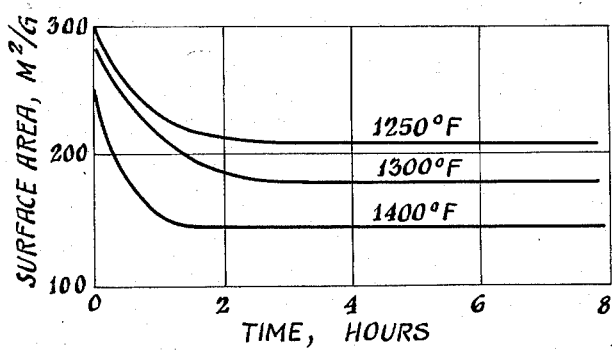

Figure 3 shows the effect of heat treatment in air at different temperatures upon surface area of a similar chromia-alumina gel.

It will be noted from Figures 2 and 3 that the attrition resistance increased with an increase in the heat treating temperature and that the surface area of the gel decreased with an increase in the treating temperature. Since a high surface area is generally desirable where the gel is employed for catalytic purposes, the optimum treating temperature, taking into account attrition resistance and surface area of the treated product, is between about 1300° F. and about 1400° F.

The chromia-containing gel, after the above heat treatment may be impregnated with a metal or metal compound appropriate to the result desired and the impregnated heat treated gel may thereafter be dried and tempered in conventional manner to afford a hard attrition-resistant impregnated chromia-containing composite.

The thermal treatment described herein may be carried out on freshly prepared chromia-containing gel subsequent to removal of water therefrom by suitable means, such as tempering in an inert atmosphere. The heat treating and tempering operations may be effected in separate vessels. Alternatively, steam tempering and air heat treating operations may be accomplished in a single unit. In such operation, the dried chromia-containing gel is heated in steam from about 350° F. to 1100° F. at a rate of 1–2° F. per minute as it flows downwardly through indirectly heated tubes. The gel then passes to the heat treating zone where it is heated in the range of 1200–1500° F. for ½ to 4 or more hours by direct contact with air preheated by a line burner. In the bottom section of the kiln, the catalyst is cooled to about 250° F. before being discharged.

The invention may be more readily understood from the following illustrative but non-limiting examples:

Example 1

A chromia-alumina hydrogel was prepared from the following reactants:

*Solution A.*—Diluted sodium aluminate containing approximately 18.3 percent $Al_2O_3$, 14.4 percent $Na_2O$ and 67.3 percent $H_2O$.

*Solution B.*—Diluted chromic acetate prepared by reduction of sodium dichromate with glycolic acid and containing approximately 26.0 percent $Cr(CH_3COO)_3$, 1.4 percent $Cr(OH)_3$, 2.3 percent $CH_3COONa$, 5.5 percent $(COONa)_2$, 0.6 percent $HCOONa$, 0.8 percent $CH_2OHCOONa$, and 63.4 percent $H_2O$.

Solutions A and B were pumped separately under pressure to an efficient mixing nozzle. The solutions were heated to 120–125° F. and mixed in equal volumes at a rate of 1.06 gallons per minute. The resulting stream of hydrosol flowed over a divider into a column of oil. The hydrosol set to beads of hydrogel and the resulting hydrogel beads were sluiced from the bottom of the forming tower in a stream of oil. After separating oil from the hydrogel beads, the latter were aged in a 20 percent by weight aqueous solution of ammonium sulfate. Since the pH of the aging solution rises as it flows through the fresh hydrogel beads, sulfuric acid was added in sufficient amount to maintain a pH of about 6.0. The bead hydrogel was aged in this solution for 24 hours, after which it was allowed to age an additional 8 hours without pH control. During this latter period, the pH of the aging solution rose from about 6.0 to about 9.5. After aging, the hydrogel was washed until a sulfate-free wash water was indicated. It is important that the hydrogel to be subsequently heat treated be substantially free of sulfate since an appreciable amount of sulfate tends to impede the described thermal hardening of the treated gel. Accordingly, the chromia-containing gel to be made more resistant to attrition by the method described herein should be substantially free of sulfate, preferably less than 0.1 percent by weight.

The washed sulfate-free hydrogel had a product concentration of 18.3 percent by weight. The hydrogel was thereafter dried in 100 percent steam at 230–235° F. for 7 hours, then gradually raised to 350° F. over a period of about 2 hours, and then tempered by heating in a closed vessel to 1100° F. at the rate of 2½° F. per minute. The resulting gel contained 32 weight percent $Cr_2O_3$ and 68 weight percent $Al_2O_3$. This product is representative of that produced by the aforementioned process of Stover and Wilson and may be considered as a blank for comparison with the catalysts which have undergone treatment in accordance with the present process.

*Examples 2–23*

A chromia-alumina gel prepared as in Example 1 was treated by placing the same in a furnace preheated to 1000° F. The temperature of the furnace was increased at a rate of 15° F. to 20° F./minute to the desired temperature with a stream of oxidizing gas passed through the sample. Passage of the oxidizing gas was continued while the gel remained at the desired temperature for the indicated time, following which the gel was removed from the furnace, placed in a sealed container and allowed to cool to room temperature. The results of this treatment for various treating conditions of time, temperature and atmosphere, as well as for the untreated gel, together with the weight per cent equilibrium fines determined by the Lauson shaker test in each instance are set forth below:

TABLE II

| Example | Time (Hrs.) | Temp., °F. | Atmosphere | Lauson Shaker Test, Percent Wt. Equilibrium Fines |
|---|---|---|---|---|
| 1 | | | | 5.6 |
| 2 | 1 | 1,250 | Air | 3.0 |
| 3 | 2 | 1,250 | do | 3.5 |
| 4 | 4 | 1,250 | do | 3.5 |
| 5 | 8 | 1,250 | do | 3.6 |
| 6 | 1 | 1,300 | do | 2.4 |
| 7 | 2 | 1,300 | do | 2.2 |
| 8 | 4 | 1,300 | do | 2.1 |
| 9 | 8 | 1,300 | do | 2.7 |
| 10 | ½ | 1,400 | do | 1.8 |
| 11 | 2 | 1,400 | do | 2.2 |
| 12 | 3 | 1,400 | do | 1.8 |
| 13 | 4 | 1,400 | do | 2.1 |
| 14 | 8 | 1,400 | do | 2.1 |
| 15 | 24 | 1,400 | do | 2.3 |
| 16 | 96 | 1,200 | do | 4.6 |
| 17 | 96 | 1,400 | do | 2.6 |
| 18 | 2 | 1,400 | 5% Steam [1] | 2.2 |
| 19 | 4 | 1,400 | do | 2.9 |
| 20 | 8 | 1,400 | do | 2.6 |
| 21 | 2 | 1,400 | 10% Steam [1] | 2.4 |
| 22 | 24 | 1,400 | 100% Steam | 10.3 |
| 23 | 2 | 1,400 | 10% Steam [1] / 10% $CO_2$ | 2.0 |

[1] Volume percent in air.

From the above-tabulated results, it will be seen that heat treatment of a chromia-alumina gel at the indicated temperatures and times in an oxidizing atmosphere afforded a distinct improvement in attrition resistance of the resulting gel. When the oxidizing atmosphere of air contained an appreciable amount of steam, the attrition resistance tended to decrease and, as will be noted from Example 22, when the atmosphere was 100 percent steam, the attrition of the gel was high, greatly exceeding that of Example 1 where the gel had not undergone heat treatment. Accordingly, it is a critical feature of the present process that the heat treatment be carried out in a dry oxidizing atmosphere. In order to effect such accomplishment, it is necessary that the gel undergoing heat treatment be substantially dry, that is, the pores of such gel should be substantially free of liquid. Ordinarily, this is achieved by drying the gel to a stage beyond that at which maximum shrinkage is obtained and thereafter heating to a relatively high temperature at which tempering of the gel takes place.

*Example 24*

A chromia-alumina gel prepared as in Example 1 was heat treated in air for 2 hours at 1400° F. The heat treated gel was then impregnated with molybdena by evacuating 1000 grams of the chromia-alumina gel particles to a pressure of about 2 mm. of mercury. Evacuation of the gel particles serves a two-fold purpose. First, it assures substantial removal of air from the pores of the gel which, if permitted to remain, would cause breakage of the gel particles when the same are subsequently contacted with aqueous impregnating solution. Second, evacuation of the gel particles affords a uniform and rapid distribution of the impregnating solution throughout the evacuated particles and thus provides a uniform, active catalytic surface.

The gel particles in evacuated condition were brought into contact with an aqueous solution of 494 grams of ammonium molybdate containing 23 percent weight $MoO_3$. The gel particles were permitted to remain in contact with the ammonium molybdate solution for a period between 1 and 60 seconds, after which the impregnated particles were removed from the vacuum chamber and tempered for one hour at 1000° F. in a steam atmosphere provided by the moisture evolved from the gel. The resulting product had the following composition:

| | Percent weight |
|---|---|
| Chromia | 28.8 |
| Alumina | 61.2 |
| Molybdena | 10.0 |

This impregnated gel, upon subjection to the Lauson shaker test, showed a percent weight equilibrium fines of 3.0, indicating that impregnation of the heat treated gel did not appreciably affect the improved attrition resistance thereof.

*Example 25*

A chromia-alumina-silica hydrogel was prepared from the following reactants:

*Solution A.*—Chromic acetate having an acetic acid to chromium mole ratio of 3.0, a chromium content of 6.318 percent and a density at 77° F. of 1.207 g./cc.

*Solution B.*—Aqueous sodium aluminate having a sodium to aluminum ratio of 1.30, an aluminum content of 11.68 percent by weight, and a density of 1.52 g./cc. at 77° F.

*Solution C.*—Aqueous sodium silicate having an $Na_2O/SiO_2$ ratio of 0.31, an $SiO_2$ content of 4.47 percent by weight, and a density of 1.04 g./cc. at 77° F.

Solutions B and C were mixed in the following proportions: solution B, 174.1 pounds; solution C, 40.32 pounds. The resulting mixture was mixed in a nozzle with solution A at a rate of 700 cc. per minute to form a hydrosol having a pH of 11.9 and a gel time of 9.4 seconds at 122° F.

The hydrosol so formed was distributed by means of a cone and allowed to flow into a column of immiscible oil where the hydrosol formed spherical bead-like particles of all-embracing hydrogel. The resulting hydrogel was then aged with a 20 percent by weight aqueous solution of ammonium sulfate for 24 hours at a pH of 9.5. Following this treatment, the hydrogel was washed free of water-soluble salts. The washed hydrogel had a product concentration of 18 percent by weight. The hydrogel was thereafter dried in superheated steam at 235° F. and then tempered 3 hours at 1000° F. in an inert atmosphere supplied by the moisture evolved from the hydrogel particles. The resulting beads of gel contained approximately 30.4 percent by weight of chromia, 66.6 percent by weight of alumina and 3.0 percent by weight of silica.

One thousand grams of the above-described chromia-alumina-silica gel beads were placed in a suitable chamber and evacuated to a pressure of 2 mm. of mercury. An aqueous solution of 500 grams of ammonium molybdate solution having a concentration of 22.2 percent by weight of $MoO_3$ was then introduced into the chamber. The gel beads were permitted to remain in contact with the ammonium molybdate solution for a period of 5 to 10 seconds, after which the impregnated gel beads were removed from the vacuum chamber and slowly heated to 1000° F. at a rate of 4° F. per minute. During the heating period, the atmosphere surrounding the impregnated gel particles was maintained free of oxygen by permitting steam from the moisture contained in the catalyst to blanket the mass of gel particles. The resulting catalyst had the following composition:

| | Percent weight |
|---|---|
| Chromia | 28.0 |
| Alumina | 59.3 |
| Silica | 2.7 |
| Molybdena | 10.0 |

The above catalyst was treated for ½ hour at 1400° F. in air. Equilibrium attrition (Lauson shaker test) before treatment was 5 percent weight fines while after treatment the equilibrium attrition was reduced to 4.1 percent weight.

The permanence of the hardening effect obtained from the described heat treatment is shown in Table III below. Chromia-alumina gel (32 percent weight $Cr_2O_3$ and 68 percent weight $Al_2O_3$), after treating for two hours at 1400° F., was humidified to the moisture contents shown with no loss in resistance to attrition.

TABLE III

| Moisture Content of Gel | Lauson Shaker Test, Percent Wt. Equilibrium Fines |
|---|---|
| Blank | 2.2 |
| 8.5 | 1.8 |
| 15.5 | 1.6 |

Additional evidence of the permanency of the treatment was obtained when the chromia-alumina gel, treated for 2 hours at 1400° F. in air, was employed in catalytic reforming of a petroleum naphtha at the following conditions:

| | |
|---|---|
| Totals pressure, p. s. i. g. | 100 |
| Space velocity, vol./hr./vol. | 1.0 |
| Temp., ° F. | 975 |
| Hydrogen to naphtha, mole ratio | 4.0 |

The catalyst was regenerated with air at 1050° F. After 328 cycles at these conditions, the equilibrium attrition value of the catalyst was found to have remained the same as the initially treated material.

The improvement achieved in accordance with the heat treating method of the invention renders the resultant gel more resistant to attrition. This property is to be distinguished from compression or crushing strength of the gel. In this regard, it is to be noted that chromia-containing gels ordinarily do not undergo a loss in compression (crushing) strength when exposed to air at elevated temperatures nor is the compression (crushing) strength of the chromia-containing gels appreciably changed by the process of the present invention.

The treatment described herein is further not to be confused with regeneration of spent chromia-containing gel composites previously used in catalytic conversion by burning a carbonaceous deposit therefrom since the instant treatment is carried out on freshly prepared, i. e., previously unused, gel and the described method was not applicable in improving attrition resistance of chromia-containing gel catalyst previously used in a catalytic conversion operation.

We claim:

1. In a method for preparing a gel consisting essentially of chromia and at least one oxide selected from the group consisting of alumina, zirconia, magnesia, silica, titania, molybdena, and manganese oxide, the improvement which comprises drying a hydrogel of the aforementioned composition until shrinkage thereof is substantially complete, tempering the dried hydrogel by heating in a non-oxidizing atmosphere at a rate not in excess of about 4° F. per minute to a temperature in the approximate range of 600° F. to 1200° F. until the gel is substantially free of moisture and thereafter subjecting the tempered gel in a dry oxidizing atmosphere containing less than about 10 percent by volume of steam to a temperature in the approximate range of 1200° F. to 1500° F. for a period of at least ½ hour but not exceeding about 96 hours.

2. In a method for preparing a gel consisting essentially of chromia and at least one oxide selected from the group consisting of alumina, zirconia, magnesia, silica, titania, molybdena, and manganese oxide, the improvement which comprises drying a hydrogel of the aforementioned composition until shrinkage thereof is substantially complete, tempering the dried hydrogel by heating in steam at a rate not in excess of about 4° F. per minute to a temperature in the approximate range of 600° F. to 1200° F. until the gel is substantially free of moisture and thereafter subjecting the tempered gel in air containing less than about 10 percent by volume of steam to a temperature in the approximate range of 1200° F. to 1500° F. for a period of at least about ½ hour but not exceeding about 96 hours.

3. In a method for preparing a chromia-alumina gel, the improvement which comprises drying a chromia-alumina hydrogel until shrinkage thereof is substantially complete, tempering the dried hydrogel by heating in a non-oxidizing atmosphere at a rate not in excess of about 4° F. per minute to a temperature in the approximate range of 600° F. to 1200° F. until the gel is substantially free of moisture and thereafter subjecting the tempered gel in a dry oxidizing atmosphere containing less than about 10 percent by volume of steam to a temperature in the approximate range of 1200° F. to 1500° F. for a period of at least ½ hour but not exceeding about 96 hours.

4. In a method for preparing a chromia-alumina gel, the improvement which comprises drying a chromia-alumina hydrogel until shrinkage thereof is substantially complete, tempering the dried hydrogel by heating in steam at a rate not in excess of about 4° F. per minute to a temperature in the approximate range of 600° F. to 1200° F. until the gel is substantially free of moisture, and thereafter subjecting the resulting gel to a temperature in the approximate range of 1200° F. to 1500° F. for a period of at least about ½ hour but not exceeding about 96 hours in an atmosphere of air containing a small amount not in excess of about 10 percent by volume of steam.

5. A process for preparing a gel consisting essentially of chromia and at least one oxide selected from the group consisting of alumina, zirconia, magnesia, silica, titania, molybdena, and manganese oxide, which comprises forming a hydrosol of chromia and at least one of the aforementioned oxides, effecting gelation of said hydrosol to a hydrogel, drying the resulting hydrogel, tempering the dried hydrogel by heating at a rate not in excess of about 4° F. per minute to a temperature in the approximate range of 600° F. to 1200° F. in a non-oxidizing atmosphere until the gel is substantially free of moisture and thereafter heating the tempered gel in a dry oxidizing atmosphere to a temperature in the approximate range of 1200° F. to 1500° F. for a period of at least ½ hour but not exceeding about 96 hours.

6. A process for preparing a gel consisting essentially of chromia and at least one oxide selected from the group consisting of alumina, zirconia, magnesia, silica, titania, molybdena, and manganese oxide, which comprises forming a hydrosol of chromia and at least one of the aforementioned oxides, effecting gelation of said hydrosol to a hydrogel, drying the resulting hydrogel, tempering the dried hydrogel by heating at a rate not in excess of about 4° F. per minute to a temperature in the approximate range of 600° F. to 1200° F. in steam until the gel is substantially free of moisture and thereafter heating the tempered gel in a dry oxidizing atmosphere to a temperature in the approximate range of 1200° F. to 1500° F. for a period of at least ½ hour but not exceeding about 96 hours.

7. A process for preparing a gel consisting essentially of chromia and at least one oxide selected from the group consisting of alumina, zirconia, magnesia, silica, titania, molybdena, and manganese oxide, which comprises forming a hydrosol of chromia and at least one of the aforementioned oxides, effecting gelation of said hydrosol to a hydrogel, drying the resulting hydrogel, tempering the dried hydrogel by heating at a rate not in excess of about 4° F. per minute to a temperature in the approximate range of 600° F. to 1200° F. in a non-oxidizing atmosphere until the gel is substantially free of moisture and thereafter heating the tempered gel in dry air to a temperature in the approximate range of 1200° F. to 1500° F. for a period of at least ½ hour but not exceeding about 96 hours.

8. A process for preparing a gel consisting essentially of chromia and at least one oxide selected from the group consisting of alumina, zirconia, magnesia, silica, titania, molybdena, and manganese oxide, which comprises forming a hydrosol of chromia and at least one of the aforementioned oxides, effecting gelation of said hydrosol to a hydrogel, drying the resulting hydrogel, tempering the dried hydrogel by heating in steam at a rate not in excess of about 4° F. per minute to a temperature in the approximate range of 600° F. to 1200° F. until the gel is substantially free of moisture and thereafter heating the tempered gel in air containing a small amount, not in excess of about 10 percent by volume, of steam to a temperature in the approximate range of 1200° F. to 1500° F. for a period of at least ½ hour but not exceeding about 96 hours.

9. A process for preparing a gel consisting essentially of chromia and at least one oxide selected from the group consisting of alumina, zirconia, magnesia, silica, titania, molybdena, and manganese oxide, which comprises forming a hydrosol of chromia and at least one of the aforementioned oxides, effecting gelation of said hydrosol to a hydrogel, drying the resulting hydrogel, tempering the dried hydrogel by heating at a rate not in excess of about 4° F. per minute to a temperature in the approximate range of 600° F. to 1200° F. in steam until the gel is substantially free of moisture and thereafter heating the tempered gel in dry air to a temperature between about 1300° F. and about 1400° F. for a period between about ½ hour and about 4 hours.

10. A process for preparing a chromia-alumina-silica gel, which comprises forming a chromia-alumina-silica hydrosol, effecting gelation of said hydrosol to a hydrogel, drying the resulting hydrogel, tempering the dried hydrogel by heating at a rate not in excess of about 4° F. per minute to a temperature in the approximate range of 600° F. to 1200° F. in a non-oxidizing atmosphere until the gel is substantially free of moisture and thereafter heating the tempered gel in a dry oxidizing atmosphere to a temperature in the approximate range of 1200° F. to 1500° F. for a period of at least ½ hour but not exceeding about 96 hours.

11. A process for preparing a chromia-alumina gel, which comprises forming a chromia-alumina hydrosol, effecting gelation of said hydrosol to a hydrogel, drying the resulting hydrogel, tempering the dried hydrogel by heating at a rate not in excess of about 4° F. per minute to a temperature in the approximate range of 600° F. to 1200° F. in a non-oxidizing atmosphere until the gel is substantially free of moisture and thereafter heating the tempered gel in a dry oxidizing atmosphere to a temperature in the approximate range of 1200° F. to 1500° F. for a period of at least ½ hour but not exceeding about 96 hours.

12. In a method for preparing a gel containing about 20 to about 50 percent by weight chromia and about 50 to about 80 percent by weight alumina, the improvement which comprises drying a chromia-alumina hydrogel having the aforesaid composition on a dry basis until shrinkage thereof is substantially complete, tempering the dried hydrogel by heating in a non-oxidizing atmosphere at a rate not in excess of about 4° F. per minute to a temperature in the approximate range of 600° F. to 1200° F. until the gel is substantially free of moisture and thereafter subjecting the resulting gel to a temperature in the approximate range of 1200° F. to 1500° F. in a dry oxidizing atmosphere for a period of at least ½ hour but not exceeding about 96 hours.

13. In a method for preparing a gel containing about 30 to about 40 percent by weight chromia and about 60 to about 70 percent by weight alumina, the improvement which comprises drying a chromia-alumina hydrogel having the aforesaid composition on a dry basis until shrinkage thereof is substantially complete, tempering the dried hydrogel by heating in a non-oxidizing atmosphere at a rate not in excess of about 4° F. per minute to a temperature in the approximate range of 600° F. to 1200° F. until the gel is substantially free of moisture and thereafter subjecting the resulting gel to a temperature in the approximate range of 1200° F. to 1500° F. in a dry oxidizing atmosphere for a period of at least ½ hour but not exceeding about 96 hours.

References Cited in the file of this patent

UNITED STATES PATENTS

| | | |
|---|---|---|
| 2,301,044 | Heard et al. | Nov. 3, 1942 |
| 2,536,085 | Pitzer | Jan. 2, 1951 |
| 2,546,031 | Hanson | Mar. 20, 1951 |
| 2,577,823 | Stine | Dec. 11, 1951 |
| 2,635,082 | Smith | Apr. 4, 1953 |
| 2,638,455 | Pitzer | May 12, 1953 |
| 2,706,741 | Sieg et al. | Apr. 19, 1955 |
| 2,737,471 | Denton | Mar. 6, 1956 |